United States Patent [19]

Abrahamson et al.

[11] Patent Number: 5,022,049
[45] Date of Patent: Jun. 4, 1991

[54] MULTIPLE ACCESS CODE ACQUISITION SYSTEM

[75] Inventors: Curtis M. Abrahamson, North Salt Lake; John W. Zscheile, Jr., Farmington; Vaughn L. Mower, Bountiful, all of Utah

[73] Assignee: Unisys Corp., Blue Bell, Pa.

[21] Appl. No.: 440,002

[22] Filed: Nov. 21, 1989

[51] Int. Cl.$^5$ ............................................ H04L 27/30
[52] U.S. Cl. ........................................ 375/1; 380/34; 380/46; 380/47
[58] Field of Search .................. 375/1, 115; 380/31, 380/33, 34, 46, 47; 364/717

[56] References Cited

U.S. PATENT DOCUMENTS

| | | | |
|---|---|---|---|
| 4,225,935 | 9/1980 | Zscheile, Jr. et al. | 364/717 |
| 4,308,617 | 12/1981 | German, Jr. | 375/1 |
| 4,320,513 | 3/1982 | Lampert | 375/1 |
| 4,638,494 | 1/1987 | Kartchner et al. | 375/115 |
| 4,809,295 | 2/1989 | Zscheile, Jr. et al. | 375/1 |

Primary Examiner—Bernarr E. Gregory
Attorney, Agent, or Firm—John B. Sowell; Mark T. Starr; Thomas J. Scott

[57] ABSTRACT

Apparatus for generating a complex composite code for fast acquisition by multiple access users is provided which comprises a composite code generator having an in-phase channel code generator and a quadrature channel code generator for generating two linear composite codes. The quadrature channel composite code is modulated onto a carrier which is 90° out of phase with the in-phase carrier. The two linear composite codes are summed together and simultaneously transmitted to the receivers. Each receiver has a plurality of components code generators which generate replica component codes for fast acquisition of the composite code. A plurality of the components codes of the in-phase composite code are derived from the like components code generators in the quadrature channel to enhance speed of acquisition without acknowledgements by the receivers that any of the components codes have been acquired.

19 Claims, 3 Drawing Sheets

FIG.3

| $C_{11}$ 11 | $C_{12}$ 12 | $G_1$ 13 | (MAJ) a27 ← 76 $C_{11}C_{12} \oplus C_{11}G_1 \oplus C_{12}G_1$ |
|---|---|---|---|
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

FIG.4

| $C_{11}$ 11 | $C_{12}$ 12 | $G_1$ 13 | (MAND) ← 77 $C_{11} \oplus C_{12}G_1$ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |

FIG.5

| $C_{21}$ 14 | $C_{22}$ 15 | $C_{23}$ 16 | (MOD) ← 78 $C_{21} \oplus C_{22} \oplus C_{23}$ |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

MULTIPLE ACCESS CODE ACQUISITION SYSTEM

BACKGROUND OF THE INVENTION

1. Field of the Invention

This invention relates to pseudo noise (PN) spread sprectum communication systems, and more particularly, to apparatus and a method for generating a multi-user code for fast acquisition that appears to unfriendly parties to be a more complex acquisition code.

2. Description of the Prior Art

Multiple-access communication systems refer to systems which permit multiple users to receive communications from a single transmitter. A typical example of such a system involves a reconnaissance vehicle which has collected substantial information to be unloaded or communicated to a plurality of ground stations over a short period of time, but in the relatively secure manner. Under such circumstances, it would be desirable for the ground stations to be capable of independently receiving a composite code which contains a quadrature or acquisition code with no data, and an in-phase or track code which does contain the desired data, and to acquire both codes in the fastest possible manner which also provides a predetermined degree of security.

In our U.S. Pat. No. 4,809,295, we described a "code lengthening system" which describes an apparatus and method for generating and acquiring in a minimum of time a lengthened PN composite code. The receiving apparatus in this patent was designed to transmit signals back to the transmitter during the acquisition of the PN composite code. This mode of operation does not lend itself to practical use in a multiple access environment.

In our U.S. Pat. No. 4,225,935, apparatus is described for generating and receiving linear composite codes which include a non-linear composite code offering greater security than a linear composite code alone and may be also rapidly acquired. While the invention disclosed in this U.S. Pat. No. 4,225,935 is not embodied in the present invention, it could be included to enhance the security of the present invention system. The present invention does employ the techniques of combining a plurality of linear PN component codes which are relatively prime with respect to each other and have an approximately equal number of binary ONES and ZEROES. With respect to the linear MAJ and MOD composite codes created from the components, these codes also possess similar correlation properties.

It would be desirable to provide a multiple access code acquisition system which incorporates the prior art composite codes but is not burdened by the disadvantage of having to transmit information back to the airborne transmitter during acquisition of the composite code.

SUMMARY OF THE INVENTION

It is a principal object of the present invention to provide a method and apparatus for producing a novel composite code for fast acquisition by a plurality of ground stations.

It is a principal object of the present invention to provide an apparatus for generating a composite code from component codes and a mask code.

It is a principal object of the present invention to provide an apparatus for generating a composite code which requires no acknowledgement by the receiver back to the transmitter that acquisition of any of the component codes have been acquired.

It is another principal object of the present invention to provide an apparatus for generating separate in-phase and quadrature composite codes and for transmitting simultaneously both composite codes.

It is a principal object of the present invention to provide an apparatus for acquiring component codes of a quadrature composite code which in turn are used to enhance acquisition of the in-phase component codes of the in-phase composite code.

It is a general object of the present invention to provide a complex composite code which may be rapidly acquired by the receiver which has information of all or most of all of the component codes being transmitted.

It is a general object of the present invention to provide a composite acquisition code having component codes of equal length and further having a mask component code of a different length.

It is a general object of the present invention to provide a composite acquisition code having balanced component codes of equal length and further having a mask component code of a different length which when combined with the other component codes provides a balanced composite code.

It is a general object of the present invention to provide a complex composite code having embedded therein a fast acquisition composite code made more complex by the addition of one or more complex component masking codes which deters unfriendly acquisition of the transmitted fast acquisition code.

It is a general object of the present invention to provide a fast acquisition code which appears more complex by the addition of a masking code which does not delay or degrade the time of acquisition of the composite code.

According to these and other objects of the present invention, there is provided apparatus for generating a complex composite code for fast acquisition by multiple access users. The composite code generator employs a quadrature channel code generator and an in-phase channel code generator for generating two linear composite codes which are combined to provide a more complex composite code. The quadrature channel composite code is modulated onto a carrier which is 90° out-of-phase with the carrier for the in-phase channel. The two channels are summed together and simultaneously transmitted to the receiver which has a plurality of component code generators which generate replica component codes for fast acquisition of the composite code. To enhance fast acquisition of the component codes, a plurality of the component codes of the in-phase composite code are derived from like component code generators in the quadrature channel.

BRIEF DESCRIPTION OF THE DRAWINGS

FIG. 3 is a table of a small portion of the component and composite acquisition codes being generated at the transmitter;

FIG. 4 is a table of an alternate component and composite acquisition code which may be generated at the transmitter; and FIG. 5 is a table of a small portion of the component and composite tracking codes being generated at the transmitter.

DESCRIPTION OF THE PREFERRED EMBODIMENT

Figure 1:
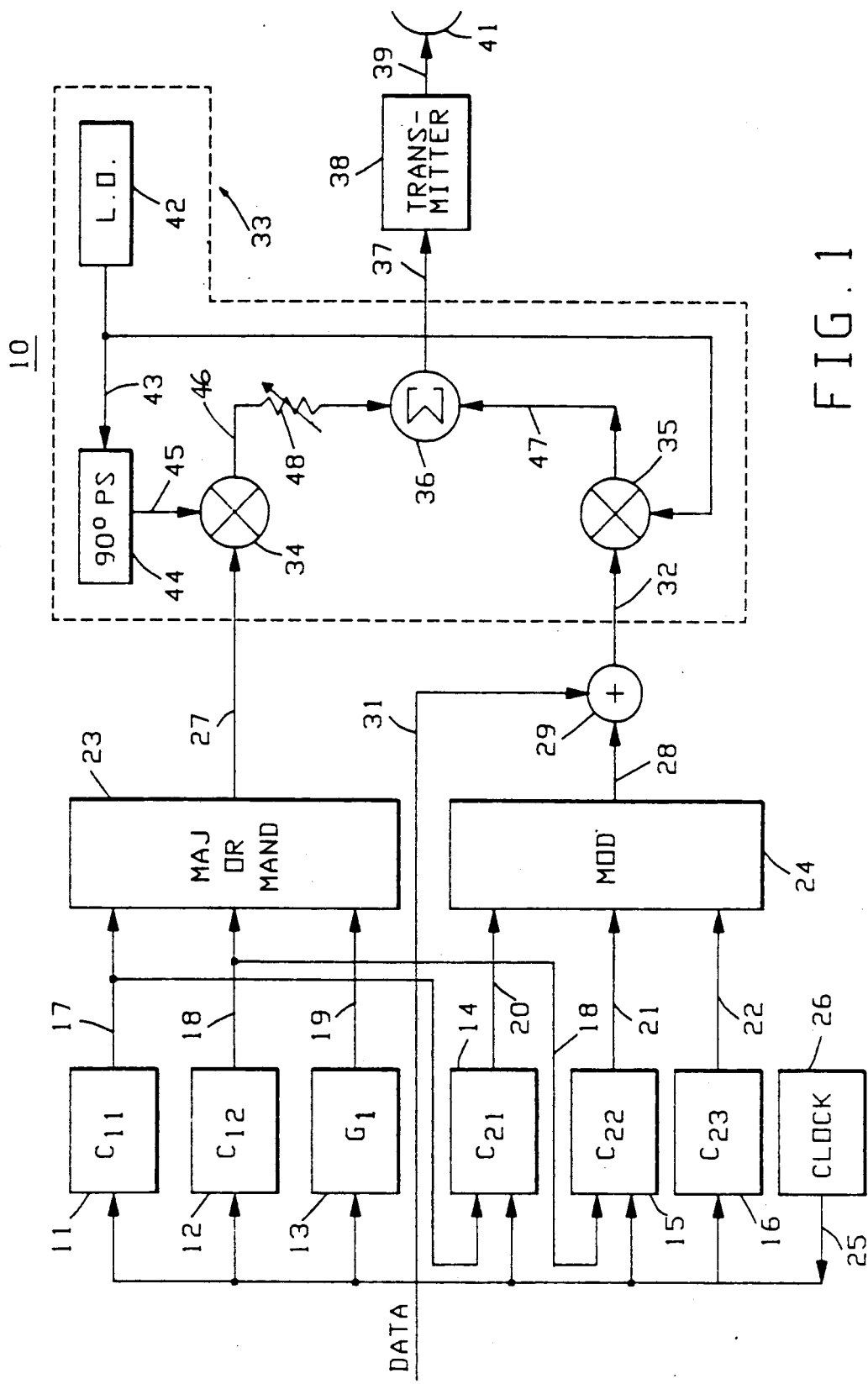
FIG. 1 is a block diagram of a simplified composite code generator illustrating the features of the present invention.

Refer now to FIG. 1 showing a block diagram of a simplified composite code generator of the type employed in the present invention. The terms and terminology to be employed in describing the present application drawings have been employed in prior art references such as our U.S. Pat. No. 4,225,935 and U.S. Pat. No. 3,728,529, assigned to the same assignor as the present application.

The composite code generator 10 comprises a plurality of component code generators 11–16, whose outputs on lines 17–22 are applied to a MAJ combiner 23 and a MOD combiner 24 as shown. The output from the component code generator 11 is applied as an input to the component code generator 14 and in similar manner the output of the component code generator 12 applied as an input to the component code generator 15 so that the component codes generated by component code generators 14 and 15 are correlated to and derived from the outputs on lines 17 and 18. As will be explained in greater detail hereinafter, by deriving the component codes for generators 14 and 15 from the component codes of generators 11 and 12, the acquisition of the component codes from generators 11 and 12 assures the acquisition of the codes generated by generators 14 and 15. All of the component code generators 11–16 have a clock input on line 25 from clock generator 26 which assures the synchronization of the component codes of equal length. In the preferred embodiment of the present invention, the linear component code produced by generator 13 is a mask or garbage code and does not have to be the same length as the other component codes nor does it have to be correlated in any way with the other component codes because it is not going to be acquired at the receiving end.

The output from component code generators 11–13 are applied to the input of the MAJ combiner 23 to produce a composite code on output line 27. In similar manner, the component codes on lines 20 to 22 are applied to the MOD combiner 24 to produce a composite code on output line 28 which is applied to an EX-CLUSIVE OR circuit 29 along with the binary data stream on line 31 to produce the PN spread data on line 32. The composite code on line 27 comprises the composite code for the quadrature channel and the composite code on line 32 comprises the code for the in-phase channel containing the data. The two composite codes are applied to the modulator 33 shown in phantom lines comprising a pair of mixers 34 and 35 having their outputs summed in a summing or combining circuit 36 to produce a combined composite signal on output line 37 which is applied to transmitter 38 to produce a signal on line 39 which is transmitted at antenna 41.

The main difference between the two composite signals on lines 27 and 32 is that the carrier for the quadrature channel is shifted 90°. Local oscillator 42 produces an output signal on line 43 which is applied directly to mixer 35 but is phase shifted by the 90° phase shifter or quadrature shifter 44 which shifts the carrier on line 45 90° before being applied to the mixer 34. Thus, the signals on output lines 46 and 47 from mixers 34 and 35 are phase shifted 90° from each other. In addition, the quadrature composite signal on line 46 is reduced in its power output by an attenuator 48 because the acquisition signal need not be as strong as the tracking signal. The power ratio difference between the two signals on lines 47 and 46 may be anywhere from 2 to 1 up to 10 to 1 depending on the circumstances of transmission.

One of the primary features of the present invention is that the code generators 14 and 15 produce component codes which are derived from and correlated with the component codes generated by generators 11 and 12. As will be explained hereinafter, the acquisition of the component codes on lines 17 and 18 not only assure the acquisition of the component codes on lines 20 and 21 but enable the receiver to dispense with the steps of acquiring the component codes produced by generators 14 and 15.

Figure 2:
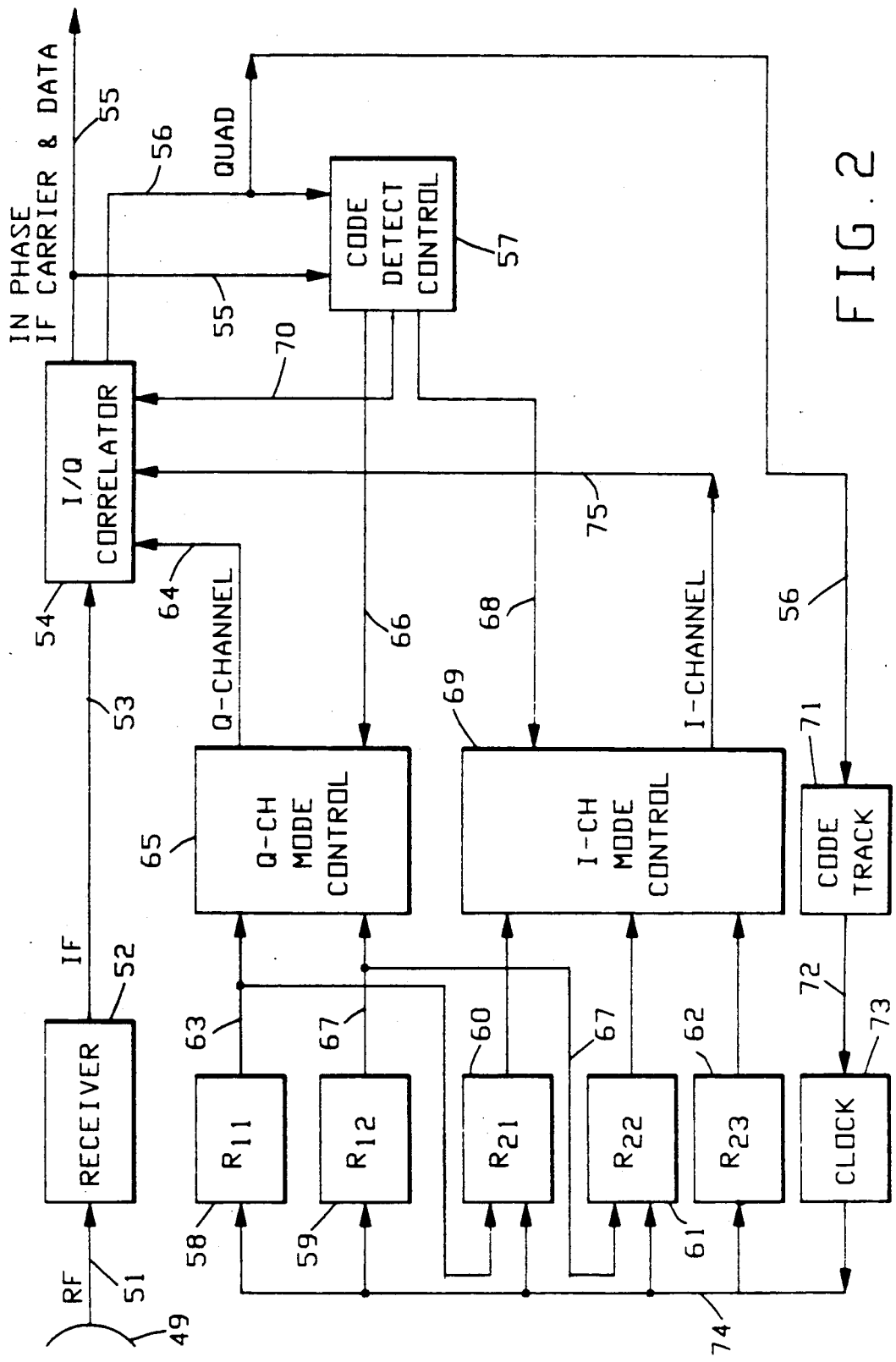
FIG. 2 is a block diagram of a simplified receiver and correlator adapted to acquire the composite codes transmitted from the FIG. 1 generator.

Refer now to FIG. 2 showing a block diagram of a simplified receiver and correlator adapted to acquire the two composite codes transmitted from the FIG. 1 transmitter 38. The combined composite code signals are received at antenna 49 and provide an R.F. signal on line 51 which is applied to the receiver 52. The receiver 52 processes the signal and steps the signal frequency to an I.F. frequency on line 53 which is applied to an I/Q correlator 54. Correlator 54 is the inverse operating structure of the modulator 33 and separates the two composite signals on line 53 from the receiver 52. The output from correlator 54 thus provides an in-phase I.F. carrier and data signal on line 55 and a quadrature I.F. carrier signal on line 56. Both signals on lines 55 and 56 are applied to a code detector 57 which detects the correlation of the replica signals on component code generators 58 to 62 which produce identical replica codes as the generators 11 to 12 and 14 to 16 shown in FIG. 1. The code on line 53 is acquired by first generating the replica code from generator 58 on line 63 to provide the replica code on line 64 from the output of the quadrature channel mode controller 65. When the first component code on line 63 is correlated with the incoming signal on line 53, a code detect signal is generated at code detector 57 to provide an acquisition signal on line 66. This enables the mode controller 65 to employ the replica generator code on line 67 to search the MAJ of the component codes 58 and 59 until the component code 59 correlates with the incoming signal on line 53 which produces a code detect or acknowledge signal on line 66 that the second component code has been acquired.

Once the two component codes corresponding to the replica component codes 58 and 59 have been acquired from the MAJ composite code received on line 51, then the code detector control 57 may initiate a signal on control line 68 to the in-phase channel mode controller 69 which will initiate the in-phase channel search of its composite code. A feature of the present invention is that the component codes produced at generators 14 and 15 of the FIG. 1 code generator were derived from the component code generators 11 and 12 and it is possible to have acquired the component codes of the generators 60 and 61 at the time that the component codes of the replica generators 58 and 59 are acquired. If this has occurred, which does occur, then it is no longer necessary to send an acknowledgement signal back to the transmitter of FIG. 1 so that the transmitter will no longer transmits the MAJ code and only transmits the MOD code because the component codes from generators 14 and 15 are already acquired and in synchronization with the replica codes 60 and 61 being produced at the input of the in-phase channel mode controller 69. It is only necessary now to search the MOD composite code which contains the component code being produced by generator 16 and also produced as a replica by replica generator 62. Stated differently, after locking onto the MAJ composite code, the code detect control 57 instructs the mode controller 69 to start search of the component code represented by the replica generator 62. Once the last component codes represented by the replica code generator 62 is acquired, the code detect control 57 can produce a signal on control line 68 to cease the search sequence. At the end of the search sequence, the output line from the correlator 54 at line 56 is now applied to a code tracking loop 71 which maintains the lock on the carrier signal and also produces a PN clock signal on line 72 which regulates or synchronizes the clock system 73 that produces the real time in-phase clock signal on line 74 which is applied to each of the replica generators 58–62. Mode controller 69 produces the MOD of generators 60–62 on its output line 75 during the search for the component code 62.

Thus, fast acquisition of the signal on line 51 comprises the following steps: 1. Search the MAJ composite code of the component codes equivalent to the composite of the replica of the codes 58 and 59 for the component code 58. Having acquired the component code 58, then search the composite code for the component code 59 in the composite code. Having once acquired both components codes 58 and 59 by virtue of design of the code generator and code replica generator, the replica codes 60 and 61 are already acquired. Then, it is only necessary to search the MOD composite code for the remaining component code of the replica generator 62. Once the last component code of the MOD composite code is acquired, the acquisition generator has acquired the complete transmitted code received on line 51 and the PN code tracking loop 71 may then maintain the phase lock on the PN code modulated onto the carrier signal present in the signal on line 56 to produce a real time in-phase clock on output line 74.

Refer now to the FIG. 3 table showing a small portion of the three component codes generated at code generators 11–13. The binary bits of the PN codes $C_{11}$ and $C_{12}$ are in vertical time sequence and are shown to contain an equal number of zeroes and ones representative of a balanced code. Even though the mask or garbage code $G_1$ may be of different length, it is preferably a balanced code so that the combination of the three component codes in the MAJ combiner still produces a balanced composite code on output line 27. To represent the balance of the code, the equation for the MAJ of the three component codes is shown at column 76. If column 76 is compared with the column $C_{11}$ from generator 11, the binary numbers will be shown to correlate 50% of the time. Further, the correlation between the output of generator 12 and column 76 is also correlated 50% of the time. As explained in the prior art reference, U.S. Pat. No. 4,225,935, this correlation produces a signal of greater magnitude at the time of correlation on lines 55 and 56 which further enhances the time of acquisition.

Refer now to FIG. 4 showing a table of a MAND composite code generator employing the same component code inputs $C_{11}$ and $C_{12}$ shown in FIG. 1. In a manner similar to FIG. 3, the three code generators 11, 12 and 13 produce individual and combined balanced codes on their output lines 17–19 to a MAND combiner 23. In similar manner, column 77 showing the output of the MAND generator equation produces a balanced composite output code which can be shown to correlate with a factor of 50% with the output of generator 11 but not with the output of generators 12 and 13. However, by MOD combining the outputs of generators 11 and 12, the MAND composite code does correlate 50% with the MOD of generators 11 and 12. Since the mask or garbage code 13 is not going to be searched, its correlation factor is of no significance during acquisition.

Refer now to FIG. 5 showing a table of a small portion of the component code inputs to the MOD combiner 24 and the composite tracking code output of the MOD combiner. As explained hereinbefore, the generators 14–16 produce the vertical column linear binary balance codes $C_{21}$, $C_{22}$ and $C_{23}$ which when combined produces a balance code shown at column 78. The MOD of the three component codes is produced by EXCLUSIVE OR modulating the individual component codes to provide the balanced composite code which has no correlation with the individual component codes, thus creates a composite code that is difficult to acquire. By deriving the codes generated by the code generators 14 and 15 from the respective generators 11 and 12, the phase of the codes for generators 14 and 15 is known. Then it is only necessary to search the unknown phase of the replica code of generator 62, shown as $R_{23}$, with the component code of generator 16 shown as $C_{23}$. Thus, having partial acquisition of the MOD composite code prior to the search of the last component $C_{23}$ of the MOD composite code, it is possible to achieve fast acquisition of the last component of the MOD composite code.

Having explained a preferred embodiment of the present invention, it will be understood that the code shown and described herein is specifically designed for multiple access users, all of whom are acquiring the identical transmitted composite code without having to generate acknowledge signals which would be received at the airborne transmitted generating the composite code. Thus, this novel multiple access code acquisition system not only provides a predetermined degree of security from acquisition by unfriendly receivers but achieves an extremely fast acquisition of the signal which permits complete transmission of the data over a short period of time which further deters interception, acquisition and exploitation.

The code generator 13 which produces the mask or garbage code is preferably a random noise generator which produces a PN code of near infinite length whose only requirement is that it be balanced, thus, never needs to be acquired when included as a component code with two known component codes of known length. Further, during the acquisition phase of the MAJ composite code or MAND composite code, it is never necessary to acquire the mask code before shifting to acquisition of the MOD code.

What is claimed is:

1. Apparatus for generating a complex composite code for fast acquisition by multiple users, comprising:
   a quadrature channel composite code generator having a plurality of individual component code generators coupled thereto and
   means for combining said component codes in a manner which provides a composite code in a quadrature channel having partial correlation between said individual component codes and the combined composite code, an in-phase channel composite code generator having a plurality of individual component code generators coupled thereto and means for combining said component codes in a manner which provides a composite code in an in-phase channel ideally having no correlation between said individual component codes and the combined in-phase channel composite code, means for deriving individual component codes in said in-phase channel from corresponding individual component code generators in said quadrature channel so that the derived individual component codes are in-phase with corresponding individual component codes, carrier generation means, modulator means for combining said in-phase channel composite code and said quadrature channel composite code onto said carrier so that said composite codes are combined as a complex carrier modulated code, and a source of data coupled to one of said composite codes.

2. Apparatus as set forth in claim 1 wherein said quadrature channel composite code generator further includes a mask component code generator which is not used to derive a corresponding in-phase component code.

3. Apparatus as set forth in claim 2 wherein said mask component code generator generates a code longer than the other component codes.

4. Apparatus as set forth in claim 2 wherein said mask component code generator generates a code of substantially infinite length.

5. Apparatus as set forth in claim 1 wherein said in-phase channel composite code generator further includes at least one component code generator which does not derive its code from a corresponding component code in said quadrature channel generator.

6. Apparatus as set forth in claim 1 wherein each component code generator in said in-phase channel composite code generator derives its component code from a corresponding code generator in said quadrature channel composite code generator.

7. Apparatus as set forth in claim 6 which further includes a mask component code generator in said quadrature channel composite code generators.

8. Apparatus as set forth in claim 6 wherein all of said component codes are of equal length.

9. Apparatus as set forth in claim 6 wherein said component codes in said in-phase channel composite code generator substantially do not correlate with the component codes in said quadrature channel composite code generator.

10. Apparatus as set forth in claim 6 wherein said component codes in said in-phase channel composite code generator are codes of integer multiples of said component codes in said quadrature channel composite code generator.

11. Apparatus as set forth in claim 1 wherein said means for combining said component codes in said quadrature channel comprises a MAJ combiner.

12. Apparatus as set forth in claim 1 wherein said means for combining said component codes in said quadrature channel comprises a MAND combiner.

13. Apparatus as set forth in claim 1 wherein said means for combining said component codes in said in-phase channel comprises a MOD combiner.

14. Apparatus as set forth in claim 1 wherein said modulator means includes mixer means comprising a pair of mixers, each having one of said composite codes as an input.

15. Apparatus as set forth in claim 14 wherein said modulator means further includes local oscillator means having a phase shifted output coupled to the mixer having the quadrature channel composite code input and a second oscillator output coupled directly to the other mixer.

16. Apparatus as set forth in claim 15 wherein said modulator means further includes summing means coupled to said pair of mixers for combining said composite codes.

17. A method of transmitting and rapidly acquiring substantially non-repeating pseudo noise (PN) spread spectrum codes, comprising the steps of:

generating a first composite code comprising a plurality of individual component codes $C_{11}$, $C_{12}$, said component codes $C_{11}$ and $C_{12}$ having correlation properties with said composite code, generating a second composite code comprising a second plurality of individual component codes $C_{21}$, $C_{22}$ and $C_{23}$ wherein said component codes $C_{21}$ and $C_{22}$ are derived from and in-phase with their corresponding component codes $C_{11}$ and $C_{12}$, respectively, and have no correlation properties with said second composite codes, simultaneously transmitting said first and said second composite codes, sequentially acquiring each of said component codes $C_{11}$ and $C_{12}$ to acquire said first composite code, and then acquiring said component code $C_{23}$ from said second composite code after having acquired in-phase component codes $C_{21}$ and $C_{22}$ when acquiring said related component codes $C_{11}$ and $C_{12}$.

18. The method of transmitting and rapidly acquiring substantially non-repeating PN codes as set forth in claim 17 which further includes the step of transmitting a mask component code $G_1$ as a component code of said first composite code.

19. A method of transmitting and rapidly acquiring substantially non-repeating PN codes as set forth in claim 18 wherein said mask component code is a non-repeating attenuated code and is not acquired before acquiring the component codes of said second composite code.

* * * * *